United States Patent [19]
Penny et al.

[11] Patent Number: 6,023,920
[45] Date of Patent: Feb. 15, 2000

[54] APPARATUS FOR DESTROYING AQUATIC VEGETATION

[75] Inventors: David M. Penny, Lawrence; Kenneth F. Knapp, DeSoto; Gerald S. Harvey, Lawrence, all of Kans.

[73] Assignee: The Master's Dredging Company, Inc., Lawrence, Kans.

[21] Appl. No.: 08/993,072

[22] Filed: Dec. 18, 1997

[51] Int. Cl.[7] .................................................. A01D 44/00
[52] U.S. Cl. ...................................................... 56/8; 114/91
[58] Field of Search ............................. 56/8, 9; 114/382; 440/90, 91

[56] References Cited

U.S. PATENT DOCUMENTS

| | | |
|---|---|---|
| 319,352 | 6/1885 | Trahern . |
| 644,885 | 3/1900 | Allen . |
| 669,820 | 3/1901 | Christen . |
| 911,357 | 2/1909 | Ziemsen . |
| 1,203,506 | 10/1916 | Doty ............................................ 440/90 |
| 1,293,706 | 2/1919 | Charboneau . |
| 1,344,626 | 6/1920 | Ellis . |
| 1,481,177 | 1/1924 | Bayard et al. . |
| 1,795,003 | 3/1931 | Allen . |
| 1,839,380 | 1/1932 | Druppel . |
| 2,486,275 | 10/1949 | Grinwald ................................... 440/90 |
| 2,537,586 | 1/1951 | Huitema . |
| 2,635,406 | 4/1953 | Chauvin . |
| 2,655,779 | 10/1953 | Sanders . |
| 2,677,926 | 5/1954 | Washbourne et al. . |
| 2,767,541 | 10/1956 | Yacoby . |
| 3,541,769 | 11/1970 | Grinwald . |
| 3,546,858 | 12/1970 | Chaplin ......................................... 56/9 |
| 3,706,185 | 12/1972 | Chaplin ......................................... 56/9 |
| 3,707,070 | 12/1972 | Chaplin ......................................... 56/1 |
| 3,884,018 | 5/1975 | Chaplin ......................................... 56/9 |
| 4,196,566 | 4/1980 | Donnelley . |
| 4,520,616 | 6/1985 | Stewart et al. . |
| 4,638,621 | 1/1987 | Stewart, III et al. . |
| 5,142,849 | 9/1992 | Amimoto et al. . |
| 5,404,696 | 4/1995 | Vasby . |
| 5,447,018 | 9/1995 | Harvey-Rioux et al. . |
| 5,481,856 | 1/1996 | Wickoren et al. . |
| 5,542,240 | 8/1996 | Snider et al. . |
| 5,551,900 | 9/1996 | Dauffenbach et al. . |
| 5,603,204 | 2/1997 | Harvey-Rioux et al. . |

OTHER PUBLICATIONS

Drawings of Hyacinth Destruction Boat, U.S. Corps. of Engineers (1944–1945); obtained from Center for Aquatic Plants, University of Florida, Gainsville, Florida.

*Primary Examiner*—Sherman Basinger
*Attorney, Agent, or Firm*—Hovey, Williams, Timmons & Collins

[57] ABSTRACT

An apparatus for destroying aquatic vegetation includes a vegetation shredder supported on a watercraft to project below the water surface so as to engage all portions of the plant proximate to the water surface. A feeder is positioned forwardly of the shredder to positively feed vegetation to the shredder as the watercraft moves in a forward direction. The apparatus further includes a framework defining a suction chamber below the water surface adjacent the submerged portion of the shredder, and an outlet spaced from the suction chamber and above the water surface. The framework and the shredder cooperate to define a sealed passageway extending between the suction chamber and the outlet. The shredder includes a rotatable element which sufficiently shreds the vegetation so that it may be discharged back into the body of water and creates a pumping action as it rotates that serves to draw vegetation toward the suction chamber, propel vegetation and water from the suction chamber through the passageway, and discharge the vegetation and water through the outlet. A side discharge chute is positioned to receive vegetation and water from the outlet and configured to direct the vegetation and water to one or both of the sides of the watercraft.

32 Claims, 6 Drawing Sheets

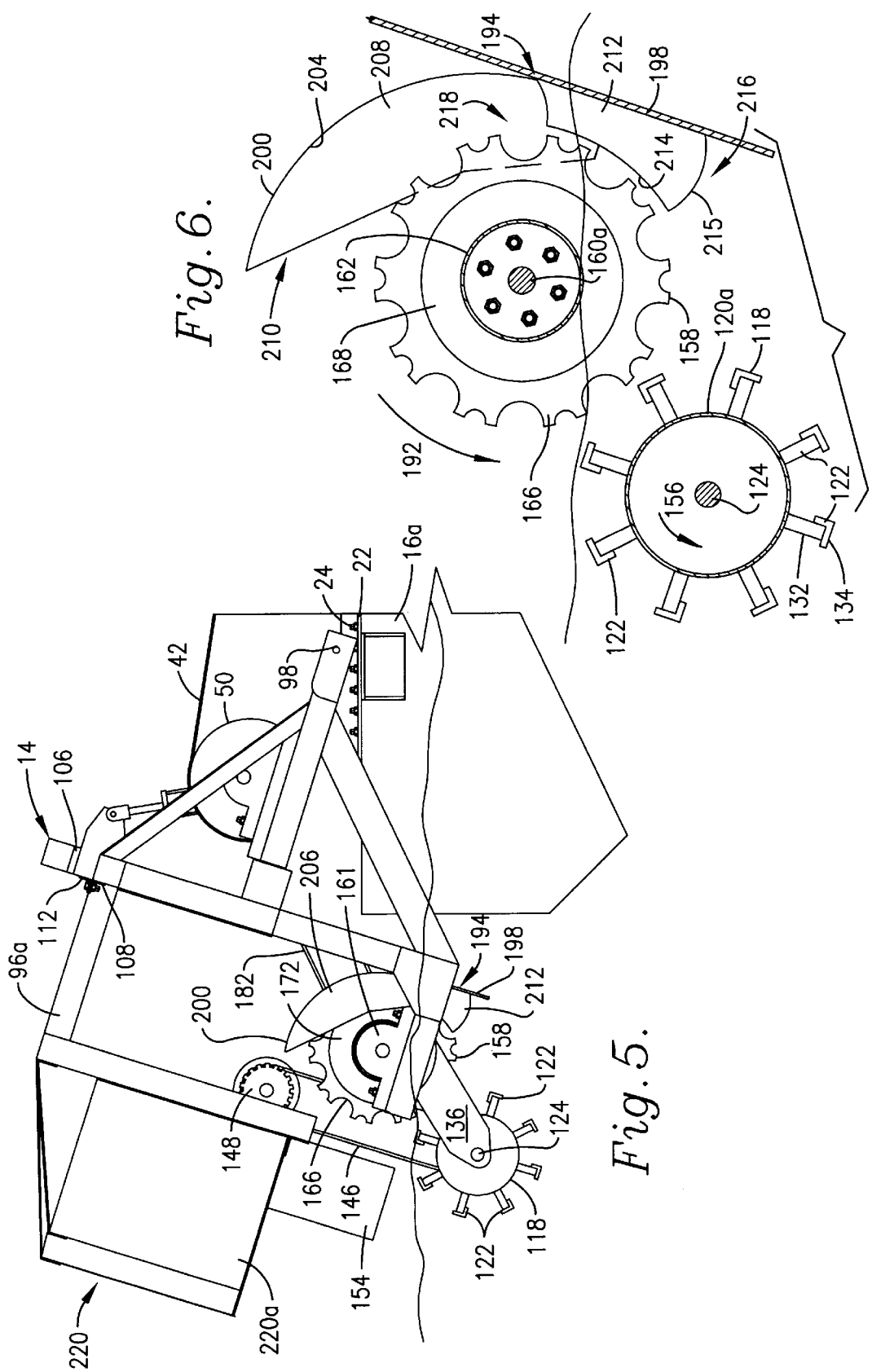

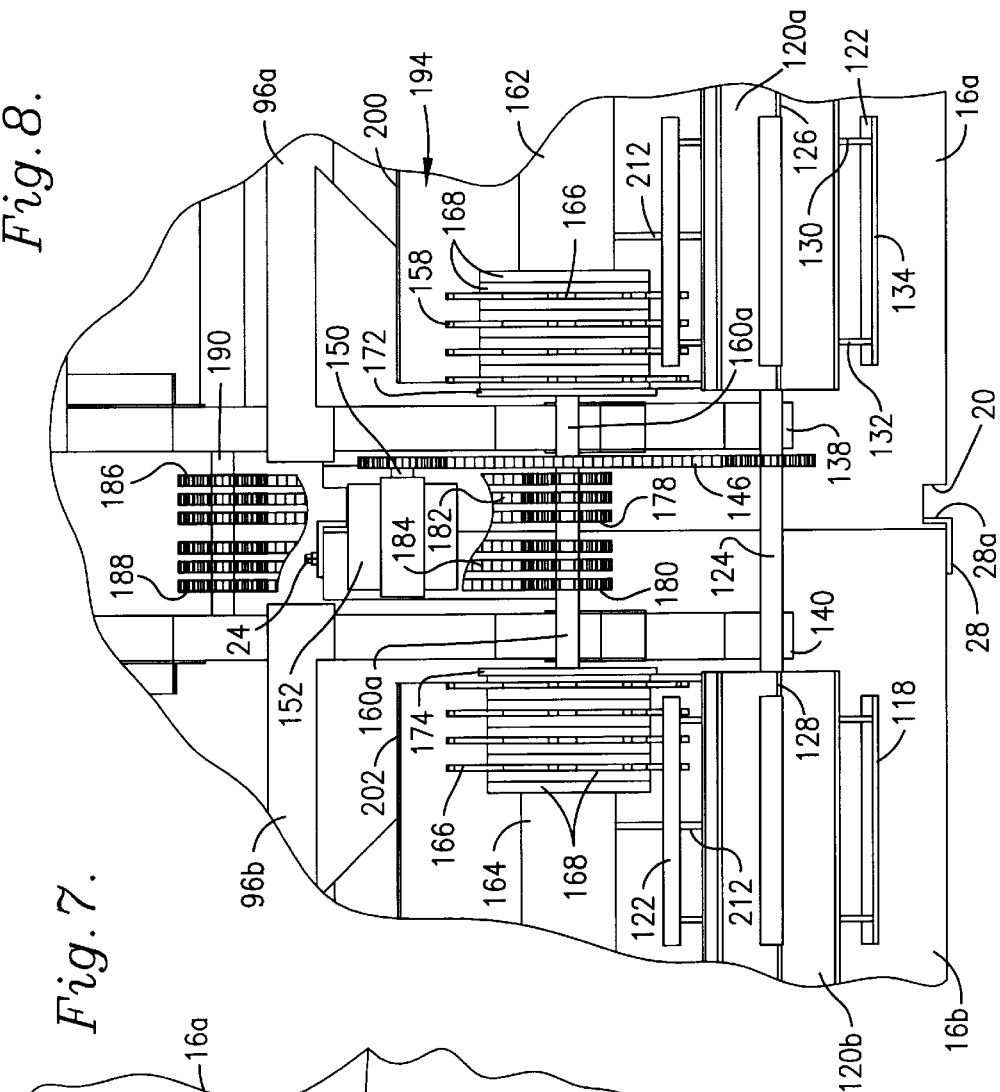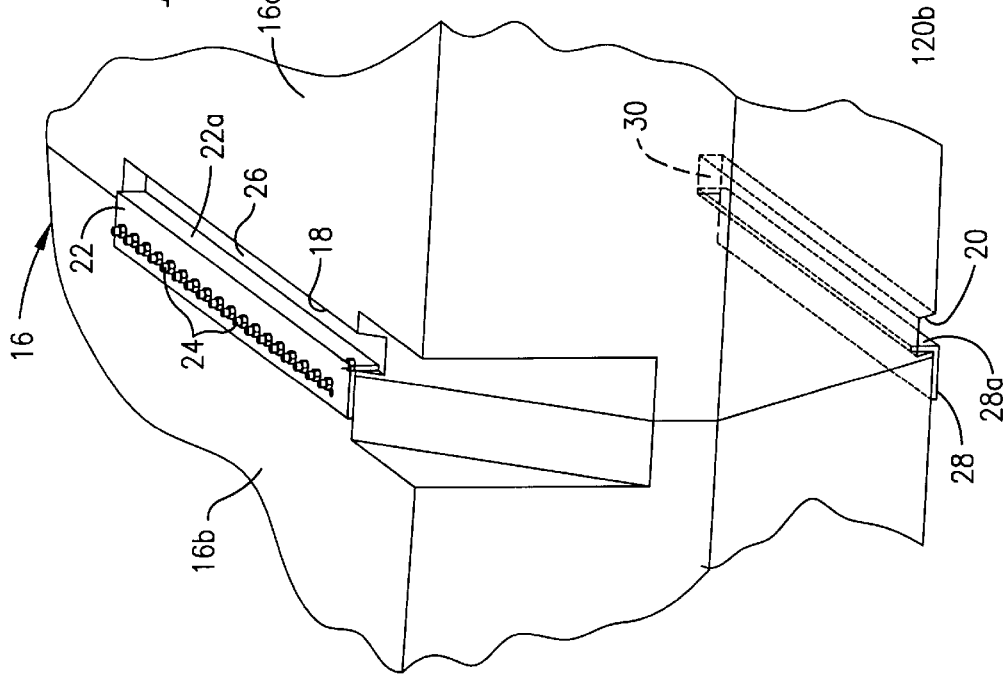

APPARATUS FOR DESTROYING AQUATIC VEGETATION

BACKGROUND OF THE INVENTION

1. Field of the Invention

The present invention relates generally to equipment for shredding, harvesting, destroying or otherwise processing aquatic vegetation. More specifically, the present invention concerns an apparatus particularly configured for destroying floating aquatic vegetation, such as water hyacinths, which have a tendency to render a body of water unnavigable.

2. Discussion of the Prior Art

Floating aquatic vegetation is a nuisance in virtually all bodies of water. However, some forms of vegetation are so problematic that marine operations become paralyzed and the aquatic ecosystem is devastated.

Particularly, the vegetation may become so densely populated and severely entangled that it presents a large floating mass. In this respect, when a boat encounters such a mass of vegetation, the boat essentially has to push the entire mass of vegetation when moving through the body of water or must, in some way, work through the mass. It will be appreciated that floating vegetation, such as water hyacinths, have been known to cover a body of water at an average of 125 tons of vegetation per acre. Most water vessels simply do not have enough power to push even one acre of water hyacinths and consequently become mired in the vegetation. Further, traditional boat hulls are not capable of slicing or otherwise working through the entangled mass of vegetation.

With respect to marine life, the vegetation will often blanket the surface of the body of water so as to block virtually all sunlight. Obviously, this adversely affects life forms utilizing photosynthetic reactions for energy (e.g., microorganisms, algae, underwater plants, etc.). If these forms of life are eradicated, the remaining marine life which rely upon these life forms for energy and oxygen production will also eventually die. Accordingly, some forms of vegetation have been known to destroy entire aquatic ecosystems. It will be appreciated that these problems are magnified because the vegetation acts like a barrier restricting movement of gasses between the atmosphere and body of water. That is, gasses produced by the decay of dead organisms are trapped within the body of water, and diffusion of oxygen from the atmosphere to the water is restricted (note, the lack of photosynthetic reactions severely depletes the level of oxygen in the water).

In the past, there have been various attempts to destroy floating aquatic vegetation or, at the very least, control the growth of the vegetation. For example, chemical and/or biological agents have been utilized in some geographic areas. However, a vast majority of chemical agents for killing vegetation are relatively uncontrollable and consequently present various residual effects, such as killing other aquatic life. Chemical agents may also render the body of water unpotable, which will clearly harm surrounding animal life. Traditional biological agents, including plant-eating organisms (e.g., insects), have also proven to be deficient in controlling aquatic vegetation. It will be noted that water hyacinths are often referred to as "weeds" because they rapidly multiply and are extremely hardy. Because most biological agents function in a relatively slow manner, this technique is typically ineffective in destroying the vegetation. Additionally, some biological agents similarly have detrimental residual effects.

Various machines have been developed to deal with the problems presented by floating aquatic vegetation. A large number of these machines are provided on marine vessels and are configured to comminute the vegetation as the vessel moves through the body of water. In some instances, the machine includes means for removing the vegetation from the water, either before or after it is comminuted. However, such conventional machinery have proven to be ineffective in destroying vegetation. For example, conventional machinery often have problems with presenting the vegetation to the comminuting device such that the vegetation is pushed by the vessel or moves around or under the vessel, rather than being comminuted. A number of conventional comminuting devices fail to sufficiently shred the vegetation. In instances where the vegetation is discharged back into the body of water, the insufficiently shredded vegetation will simply regrow.

OBJECTS AND SUMMARY OF THE INVENTION

Responsive to these and other problems, an important object of the present invention is to eliminate the troubles presented by floating aquatic vegetation, as noted hereinabove. Particularly, an important object of the present invention is to provide a system for destroying a dense, entangled mass of aquatic vegetation so as to improve marine navigation and reduce the risk of damage to the aquatic ecosystem. It is also an important object of the present invention to provide a machine for destroying aquatic vegetation that does not require the use of chemical nor biological agents. An additional object of the present invention is to provide a device for destroying aquatic vegetation, wherein the device is provided on a water vessel and includes a shredder for shredding the vegetation. In this respect, it is an object of the present invention to provide a device having an aquatic vegetation shredder that sufficiently shreds the vegetation so that it may be discharged back into the body of water. Yet another object of the present invention is to provide a device having an aquatic vegetation shredder, with the device being configured to draw vegetation to the shredder as the vessel moves through the water.

According to these and other objects apparent from the following description of the preferred embodiment, the present invention concerns an apparatus for destroying aquatic vegetation in proximity to the surface of a body of water, wherein the apparatus includes a watercraft, a vegetation shredder, and a feeder positioned forwardly of the shredder to positively feed vegetation to the shredder as the watercraft moves in a forward direction. It will be appreciated that water hyacinths comprise a bulb floating just below the water surface, a root system that projects several inches below the water surface, and a stem including foliage projecting above the water surface. The vegetation shredder projects below the water surface so that virtually the entire plant is engaged by the shredder, which essentially eliminates the possibility of plant regrowth. The feeder ensures that vegetation encountered by the apparatus is directed to the shredder for processing. In the preferred embodiment, the feeder includes a rotatable element that is at least partly submerged and operable to force the vegetation under the feeder toward the vegetation shredder.

The apparatus is provided with a casing framework defining a suction chamber below the water surface adjacent the submerged portion of the shredder, and an outlet spaced from the suction chamber and above the water surface. The shredder includes a rotatable element which cooperates with the casing framework to define a sealed passageway extending between the suction chamber and the outlet. Accordingly, the element creates a pumping action as it rotates that serves to draw vegetation toward the suction chamber, propel vegetation and water from the suction chamber through the passageway, and discharge the vegetation and water through the outlet. This construction clearly facilitates the movement of vegetation toward the shredder as the watercraft travels through the water.

The apparatus is also provided with a side discharge chute positioned to receive vegetation and water from the outlet and configured to discharge the vegetation and water to the body of water adjacent one or both of the sides of the watercraft. This feature is particularly useful with an apparatus having a forwardly facing outlet that might otherwise discharge the water and vegetation from the shredder to a location directly in front of the apparatus so as to hinder movement of the vegetation to the shredder as the watercraft travels forwardly through the body of water. In other words, the side discharge chute directs vegetation and water received from the shredder to the sides of the watercraft, rather than allowing the vegetation and water propelled through the outlet to interfere with movement of vegetation to the shredder.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 5 is an enlarged, fragmentary side elevational view of the front end of the watercraft and processing header swingably mounted to the watercraft, particularly illustrating the water level when the apparatus is placed in a body of water;

FIG. 6 is an enlarged, fragmentary side elevational view of a portion of the header, particularly illustrating the feeder, the suction chamber, the outlet, and the passageway defined therebetween;

FIG. 7 is an enlarged, fragmentary perspective view of the front end of the watercraft, with the header being removed to show the connection between the hull sections; and FIG. 8 is an enlarged, fragmentary from elevational view of the apparatus with parts being removed to show the drive for the feeder.

DETAILED DESCRIPTION OF THE PREFERRED EMBODIMENT

Figure 1:
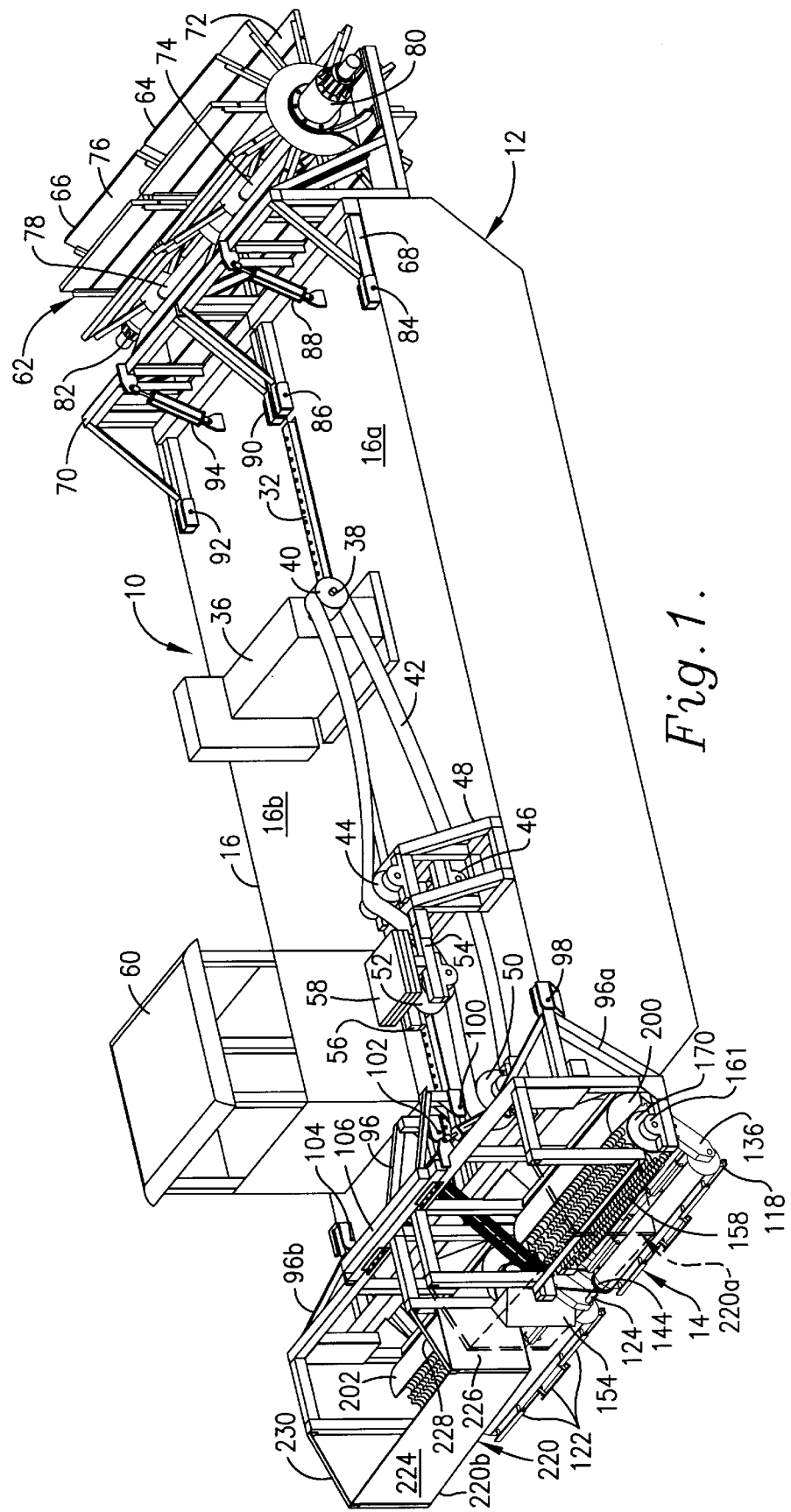
FIG. 1 is a perspective view of an aquatic vegetation destroying apparatus constructed in accordance with the principles of the present invention, with the left section of the side discharge chute being removed to reveal the left sections of the vegetation shredder and feeder.

Referring now to FIG. 1, an apparatus 10 constructed in accordance with the principles of the present invention generally includes a watercraft 12 and a vegetation processing header 14 positioned adjacent the bow end of the watercraft 12. The apparatus 10 is specifically designed to destroy aquatic vegetation growing proximate to the surface of a body of water, such as water hyacinths. A water hyacinth includes a bulb floating just below the water surface, a submerged root system projecting several inches below the bulb, and a stem projecting from the bulb and including foliage disposed above the water surface. The roots and stems of adjacent plants tend to intertwine so that a group of plants present a dense, entangled mass of floating vegetation. As will subsequently be described below, the processing header 12 is operable to draw the mass of vegetation thereto and shred virtually the entire mass, as the watercraft moves forwardly through the body of water. Those ordinarily skilled in the art will appreciate that destruction of all portions of the plant essentially eliminates the possibility of plant regrowth.

Figure 2:
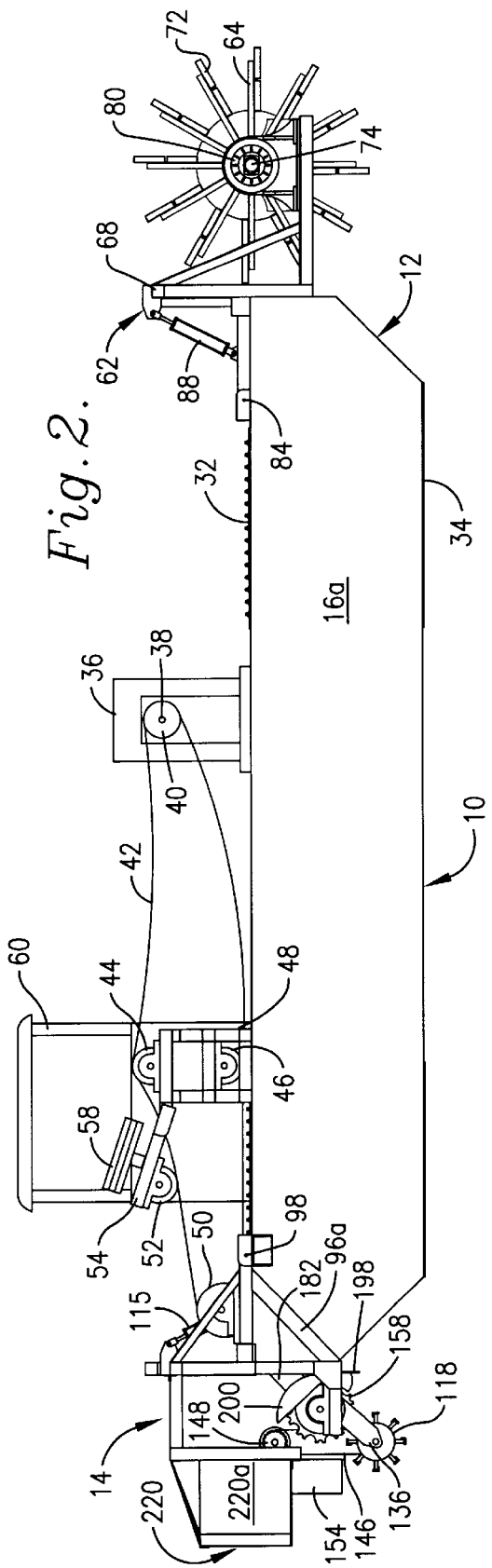
FIG. 2 is a side elevational view of the apparatus shown in FIG. 1, with the left section of the side discharge chute being shown in full.
Figure 3:
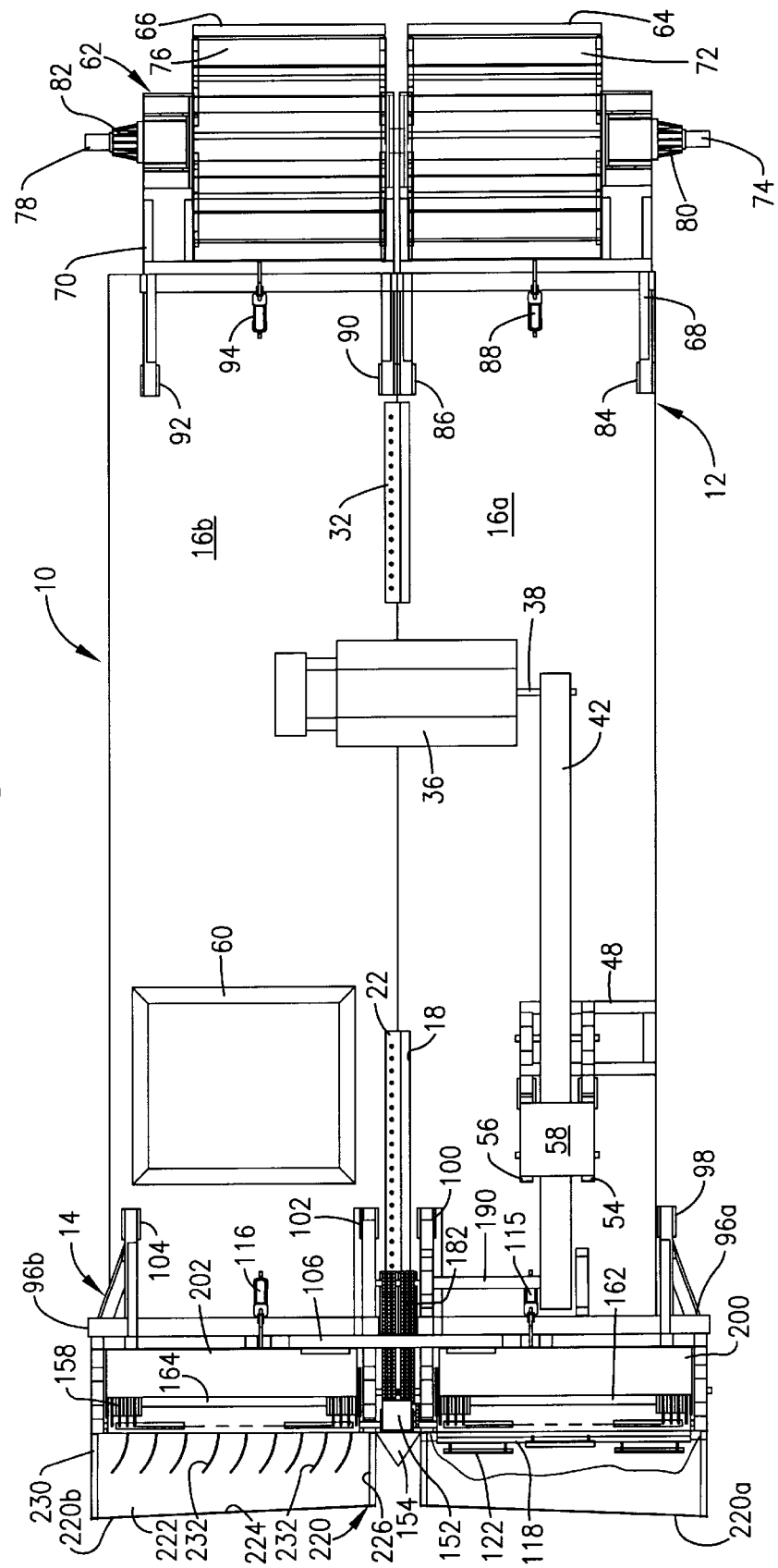
FIG. 3 is a top plan view of the apparatus shown in FIG. 1, with a portion of the left section of the side discharge chute being removed, along with a number of the cutting discs and spacers located between the ends of the left section of the shredder.

The watercraft 12 selected for illustration generally includes a hull 16 comprising port and starboard sections 16a and 16b, each of which is formed of a barge-type vessel that is configured to fit within the trailer of a conventional tractor-trailer truck. As perhaps best shown in FIG. 7, the hull sections 16a and 16b are fastened to one another for preventing relative movement therebetween so that the sections cooperatively present the hull 16. Particularly, adjacent the bow end of the port section 16a are a pair of longitudinally extending recesses 18 and 20 defined along the top and bottom faces, respectively, of the hull section 16a. An upper L-shaped attachment bar 22 is attached to the top face of the starboard hull section 16b by a plurality of bolt assemblies 24 in generally the same longitudinal position as the recess 18 defined in the port hull section 16a. The downwardly depending leg 22a of the attachment bar 22 is received within the recess 18 and has a length dimension that is greater than the vertical dimension of the recess 18. As the attachment bar 22 is fastened to the starboard hull section 16b by tightening the bolt assemblies 24, the leg 22a engages the recessed surface 26 of the port hull section 16a. Furthermore, the bolt assemblies 24 are sufficiently torqued so that the depending leg 22a of the attachment bar 22 exerts a significant force against the surface 26. A lower L-shaped attachment bar 28 is similarly fastened to the bottom face of the starboard hull section 16b and includes an upwardly projecting leg 28a received within the lower recess 20 of the port section 16a and pressed against the recessed surface 30 (see FIG. 8). As perhaps best shown in FIGS. 1–3, the hull sections 16a and 16b include similar upper and lower points of connection 32 and 34 adjacent the stern end of the hull 16. It will be appreciated that the four above-noted points of connection cooperatively prevent relative lateral and longitudinal movement between the hull sections 16a and 16b.

Supported on the top face of the hull 16 is a power source 36 preferably in the form of an internal combustion engine. The engine 36 includes a generally horizontal drive shaft 38 (see FIG. 1) carrying a sheave 40 entrained by an endless belt 42. The belt 42 extends forwardly to entrain a pair of idler sheaves 44 and 46 supported on a frame 48 and ultimately loops around a driven sheave 50 located adjacent the bow end of the hull 16. Although not shown or described in detail, it will be appreciated by those of ordinary skill in the art that each of the sheaves 44,46,50 are rotatably supported by suitable means, such as a support shaft journaled at opposite ends by a pair of bearing assemblies. The tension of belt 42 is maintained by an tensioning sheave 52 yieldably biased downwardly against the upper stretch of the belt. Particularly, the tensioning sheave 52 is rotatably mounted between a pair of arms 54 and 56 swingably supported on the frame 48. A weight 58 carried by the arms 54 and 56 causes the tensioning sheave 52 to yieldably press against the upper stretch of the belt 42. The engine 36 is also drivingly connected to a pressurized hydraulic power unit (not shown) that controls the various hydraulically powered components of the apparatus 10, as will subsequently be described. The engine 36 and hydraulic power unit are conveniently controlled from a cab 60 located adjacent the bow end of the starboard hull section 16b.

Adjacent the stern end of the watercraft 12 is a propulsion assembly 62 drivingly coupled with the engine 36 for propelling the watercraft 12 through a body of water. In the illustrated embodiment, the propulsion assembly 62 includes a pair of paddle wheels 64 and 66 rotatably supported by respective frames 68 and 70. As perhaps best shown in FIG. 1, the port paddle wheel 64 comprises a plurality of circumferentially spaced paddles 72 projecting radially from a central shaft 74 journaled for rotational movement relative to the frame 68. The starboard paddle wheel 66 likewise comprises a plurality of paddles 76 projecting from a central shaft 78. The paddle wheels 64 and 66 are reversibly driven by separate hydraulic motors 80 and 82. Preferably, the motors 80 and 82 are each separately connected to the hydraulic power unit by suitable means, such as high-pressure hoses (not shown), thereby providing independent control of the rotation of the paddle wheels 64 and 66. Accordingly, the paddle wheels 64 and 66 may be rotated at different speeds and directions relative to one another. In this respect, the watercraft 12 may perform a so-called "zero radius turn" simply by rotating the paddle wheels 64 and 66 in opposite directions at generally the same speed. However, the term "independent" as used herein shall not be interpreted to mean that the paddle wheels 64 and 66 must operate at different speeds or directions of rotation relative to one another, nor that the paddle wheels cannot be operated simultaneously by suitable controls (not shown) in the cab 60 that ensure the paddle wheels rotate at the same speed and direction. In the latter instance, the watercraft 12 may be provided with a rudder (not shown) or other suitable means for controlling steering.

As perhaps best shown in FIG. 1, the frame 68 carrying the port paddle wheel 64 is swingably supported on the hull 16 by a pair of pivot connections 84 and 86. A hydraulic cylinder 88 pivotally connected between the frame 68 and hull 16 serves to control swinging movement of the frame 68 relative to the hull 16. The frame 70 carrying the starboard paddle wheel 66 is similarly supported on the hull 16 by pivot connections 90 and 92 and swung relative to the hull 16 by a hydraulic cylinder 94. Swinging of the frames 68 and 70 may be necessary for various reasons well understood by those skilled in the art. For example, the frames may be swung upwardly from the position shown in FIG. 2 if an obstruction below the water surface, such as a bank, is encountered.

The principles of the present invention should not be limited to the watercraft 12 illustrated herein. That is, it is entirely within the ambit of the present invention to utilize various other watercraft constructions. For example, various other hull designs and shapes may be utilized. Furthermore, it is not necessary that the watercraft 12 include the propulsion assembly 62, but rather another vessel, such as a tugboat, may be used to move the watercraft through the body of water. On the other hand, if the watercraft 12 is provided with a propulsion assembly, the assembly may be variously constructed.

With the foregoing caveat in mind, the processing header 14 includes a frame 96 comprising port and starboard sections 96a and 96b swingably mounted to the bow end of the watercraft 12. Particularly, a pair of pivot connections 98 and 100 serve to swingably support the port frame section 96a on the hull 16. The starboard frame section 96b is likewise supported on the hull 16 by a pair of pivot connections 102 and 104. A laterally extending bar 106 extends partly across the tops of both frame sections 96a and 96b. The frame sections 96a and 96b each include an L-shaped connecting element 108 and 110 which is in lateral registration with an L-shaped connecting element 112 and 114 fixed to the bar 106 (see FIG. 4). The forwardly projecting legs of the corresponding connecting elements 108,112 and 110,114 are fastened to one another by suitable means, such as bolt assemblies, so that the frame sections 96a and 96b are fixed relative to one another. That is, because the bar 106 is connected between the frame sections 96a and 96b, swinging movement of one of the sections necessarily corresponds with swinging movement of the other section. A pair of hydraulic cylinders 115 and 116 pivotally connected between the hull 16 and the frame 96 serve to swing the frame about a substantially horizontal, laterally extending axis relative to the hull. The cylinders 115 and 116 are connected to the hydraulic power unit (not shown) so that the operator may control swinging of the frame from the cab 60. However, the frame 96 is normally swung to an operating position (e.g., see FIG. 5) in which the various components carried by the frame are proximate to the water surface during operation.

At the lowermost boundary of the processing header 14 is a vegetation feeder 118 preferably including a laterally extending drum 120 and a plurality of spaced paddle assemblies 122 projecting generally radially from the drum 120. In the illustrated embodiment, the drum 120 comprises a pair of spaced apart sections 120a and 120b (see FIG. 4) carried on a common shaft 124 so that relative rotation between the sections is prevented. Each drum section 120a and 120b has a plurality of longitudinally extending, circumferentially spaced ribs 126 and 128, respectively, which further promote movement of water and vegetation about the drum sections as they are rotated. For the sake of brevity, only one paddle assembly will be described with the understanding that the remaining paddle assemblies are similarly constructed. With respect to the lowermost paddle assembly on the port drum section 120a shown in FIG. 8, the assembly includes a pair of radially projecting supports 130 and 132 spaced along the length of the drum section 120a and an L-shaped blade 134 fixed to the supports. One leg of the blade 134 engages the outermost ends of the supports 130 and 132, while the other leg of the blade 134 engages a portion of one of the sides of the supports 130 and 132 (see FIG. 5). It will be appreciated that this degree of contact improves the connection between the blade 134 and the supports 130,132 when the parts are assembled using conventional welding techniques. However, the blade may simply comprise a flat plate attached to one side of the supports, if desired.

Figure 4:
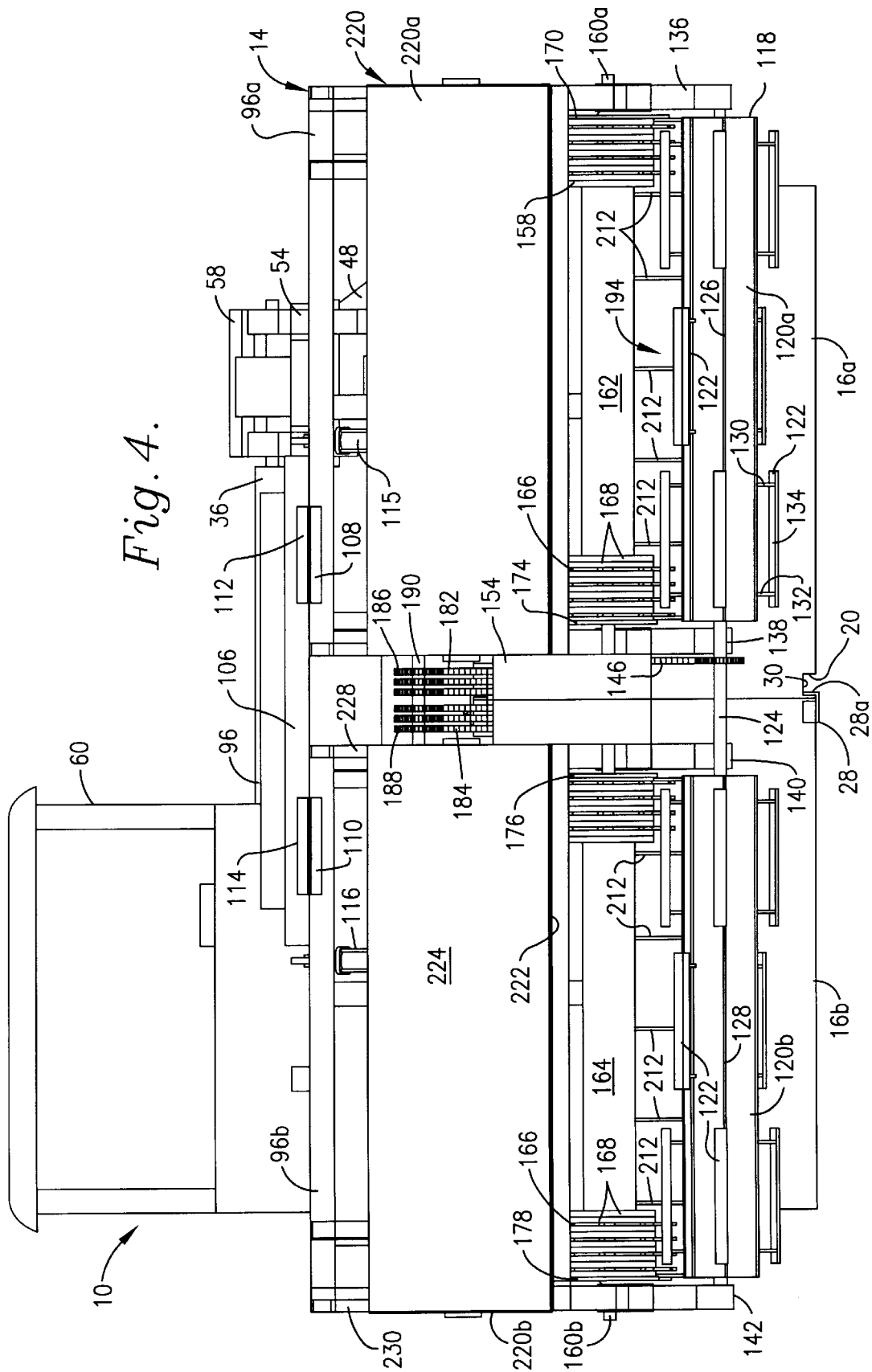
FIG. 4 is an enlarged front elevational view of the apparatus shown in FIG. 1.

As perhaps best shown in FIG. 4, the common shaft 124 carrying the drum sections 120a and 120b is rotatably supported on four arms 136,138,140,142 projecting downwardly and forwardly from the frame 96. Located on the shaft 124 between the drum sections 120a and 120b is a sprocket 144 (see FIG. 1). A chain 146 entrains the sprocket 144 and an upwardly spaced drive sprocket 148 carried on the output shaft 150 of a hydraulic motor 152. The hydraulic motor 152 is mounted to the backside of a triangular shaped guide 154 connected between the frame sections 96a and 96b, and is coupled with the hydraulic power unit (not shown) by suitable means such as high-pressure hoses (also not shown). Accordingly, the operator is capable of controlling rotation of the feeder drum 120 from within the cab 60. In any case, the drum 120 is preferably rotated in the direction of arrow 156 (see FIG. 6) so that vegetation encountered by the drum is forced below the water surface, under the drum and rearwardly to a location behind the drum.

The processing header 14 further includes a vegetation shredder 158 supported on the frame 96 at a location spaced generally rearwardly and upwardly from the feeder 118. The shredder 158 includes a central shaft comprising a pair of spaced apart, axially aligned port and starboard shaft sections 160*a* and 160*b* (see FIG. 8) rotatably mounted on the respective frame sections 96*a* and 96*b* by suitable bearing assemblies 161 (only the outermost assembly on the port side of the frame 96 being shown). Carried on each shaft section 160*a* and 160*b* is a cylindrical drum 162 and 164, respectively, which in turn support a plurality of circular cutting discs 166 spaced along the length thereof The illustrated cutting discs 166 have each been formed of a coulter disc commonly used in the agricultural industry, with additional notches being cut along the periphery of the coulter disc to provide a more aggressive cutting action. A pair of annular spacers 168 are provided between each pair of adjacent cutting discs 166 for maintaining equal spacing between the discs supported on the corresponding drum 162 or 164. Furthermore, the spacers 168 are preferably formed of a resilient and compressible material, such as rubber, so that as the outermost cutting discs on each drum are pressed toward one another, the spacers compress and thereby grip the periphery of the drum and exert a resilient force against the adjacent discs. It has been determined that the spacers on opposite sides of each cutting disc exert sufficient forces against the disc to clamp it in place so that no additional connection means need be provided between the discs and the corresponding drum. That is to say, this configuration eliminates the need for each cutting disc to be individually attached to the corresponding drum. As perhaps best shown in FIGS. 4 and 8, a pair of clamping plates 170,172 and 174,176 are bolted onto the ends of each drum 162 and 164, respectively, for pressing the outermost discs toward one another as the bolts are tightened.

The shaft sections 160*a* and 160*b* of the vegetation shredder 158 each carry a set of sprockets 178 and 180 adjacent the innermost end thereof. A set of chains 182 and 184 entrain each set of sprockets 178 and 180 and extend upwardly and rearwardly to wrap around corresponding sets of sprockets 186 and 188 fixed to a transverse drive shaft 190. The drive shaft 190 is fixed relative to the driven sheave 50 so that driving power is supplied to the vegetation shredder 158 by the belt drive connected to the engine 36. As will be further described below, the shredder 158 is preferably rotated in the direction of arrow 192 (see FIG. 6), such that the feeder 118 and shredder 158 rotate in the same direction.

As perhaps best shown in FIG. 6, the vegetation shredder 158 is partly surrounded by a casing framework, generally referenced by the numeral 194. The casing framework 194 includes a generally upright, laterally extending retainer plate 198 fixed to the frame 96. Although not shown, it will be appreciated that the retainer plate 198 comprises separate sections, each of which is fixed to a corresponding frame section 96*a* and 96*b*. The retainer plate 198 is spaced rearwardly from the shredder 158 and projects downwardly beyond the shredder 158 for restricting movement of vegetation beyond the shredder, as will further be described. In the illustrated embodiment, the retainer plate 198 is substantially flat and solid, although the principles of the present invention are equally applicable to various other retainer constructions. For example, the retainer may alternatively comprise a curved and/or perforated plate, with the perforations being small enough to prevent movement of vegetation beyond the plate yet allow water to flow virtually freely therethrough.

The casing framework 194 further includes a pair of shrouds 200 and 202, each of which partly encases the associated sections of the shredder 158 (i.e., each shredder section being generally defined by the corresponding drum 162 or 164). For the sake of brevity only the port shroud 200 will be described herein, with the understanding that the starboard shroud 202 is similarly constructed. The shroud 202 includes an arcuate back wall 204 projecting generally upwardly and forwardly from the retainer plate 198 and a pair of generally vertical, laterally spaced side walls 206 (FIG. 5) and 208 (FIG. 6). As perhaps best shown in FIG. 6, the forward edges of the walls 204,206,208 cooperatively define a forwardly facing outlet 210 through which water and vegetation is propelled by the shredder 158, as will subsequently be described.

The casing framework 194 further includes a plurality of laterally spaced deflectors 212 projecting forwardly from the retainer plate 198. Each deflector 212 preferably comprises a substantially flat plate having a concave leading edge 214 (see FIG. 6) and a convex bottom edge 215 extending between the leading edge 214 and the retainer plate 198. The leading edge 214 of the deflector 212 defines an arc corresponding to a circle concentric with, but slightly larger, than cutting discs 166 so that a nominal and consistent space is defined therebetween. It will be appreciated that the deflectors 212 were originally designed to prevent objects, such as logs, from lodging between the cutting discs 166 and the respective shrouds 200 and 202. However, it has been determined that the deflectors 212 further function in unexpected manner by cooperating with the various other components of the casing framework 194 to facilitate operation of the vegetation shredder 158, as will further be described.

Moreover, it has been determined that during operation the casing framework 194 functions as a pump casing, and the shredder 158 functions as an impeller. The shredder 158 is consequently operable to draw vegetation and water thereto and propel the vegetation and water through the outlet 210. Particularly, when the processing header 14 is swung to the desired operating position (shown in FIGS. 5 and 6), the vegetation shredder 158 is submerged so that the cutting discs 166 and the spacers 168 project below the water surface. Further, the casing framework 194 defines a suction chamber 216 associated with each section of the vegetation shredder 158. In the illustrated embodiment, the lowermost portion of each shroud 200 and 202 cooperates with the submerged portions of the retaining plate 198 and the deflectors 212 to define the suction chamber 216. As shown in FIG. 6, the suction chamber 216 is located below the water surface adjacent the submerged portions of the cutting discs 166 and spacers 168. In this respect, the shredder 158 and casing framework 194 cooperatively define a passageway 218 extending between the suction chamber 216 and the outlet 210. As long as the shredder 158 and casing framework 194 project sufficiently below the water surface to "seal" the passageway 218, rotation of the shredder in the direction of arrow 192 will cause vegetation and water to be drawn to the suction chamber 216, propelled through the passageway 218, and discharged through the outlet 210. However, if the header 14 is swung sufficiently upwardly so that a gap is defined between the water surface and the shredder 158 and/or the casing framework 194 so that air may pass through the gap into the passageway 218 (i.e., if the passageway 218 loses its seal), the processing header 14 essentially loses its prime and the pumping action is terminated. The header 14 must be returned to the operating position so that the shredder 158 and casing framework 194 establish the seal before the pumping action is restarted.

It is noted that the shroud 200 is the primary portion of the framework 194 cooperating with the shredder 158 to define the passageway 218 above the water surface. Additionally, the spacers 168 facilitate sealing of the passageway 218 by providing radially larger structure than the drums 162,164 between each pair of spaced cutting discs 166. If the shredder 158 did not include the spacers 168, it would be necessary to swing the header 14 sufficiently downwardly so that drums 162,164 projected below the water surface, otherwise the passageway 218 would not be sealed between each pair of cutting discs 166. Further, the sidewalls 206 and 208 of the shrouds 200 and 202 are spaced very close to the outermost cutting discs 166 on the respective drums 162 and 164 so that a seal is effectively provided therebetween once vegetation and water is being propelled through the passageway 218 (i.e., once the header has been primed). The deflectors 212 decrease the likelihood of the header losing its prime (i.e., decrease the likelihood of the passageway 218 becoming unsealed) during operation, because they project well below the water surface.

The processing header 14 further includes a side discharge chute 220 for directing vegetation and water received from the outlet 210 to one or both sides of the watercraft 12. Without the side discharge chute 220, the vegetation and water propelled forwardly through the outlet 210 may likely interfere with the movement of unprocessed vegetation toward the processing header 14. The illustrated side discharge chute 220 comprises a pair of spaced sections 220*a* and 220*b* associated with respective ones of the shrouds 200 and 202. The port chute section 220*a* is configured to receive vegetation and water propelled through the outlet 210 and discharge the vegetation and water to the body of water adjacent the port side of the watercraft 12. On the other hand, the starboard chute section 220*b* is configured to discharge vegetation and water received from the outlet defined by the shroud 202 to the body of water adjacent the starboard side of the watercraft 12.

For the sake of brevity, only the starboard chute section 220*b* will be described herein, with the understanding that the port chute section 220*a* is similarly constructed. The chute section 220*b* comprises a laterally extending pan including a bottom wall 222 projecting forwardly from the frame section 96*b* (see FIG. 3), a front wall 224 projecting generally upwardly from the forwardmost edge of the bottom wall 222 (see FIG. 1), and an inner sidewall 226 projecting generally rearwardly from the front wall 224 and upwardly from the bottom wall 222. A pair of angle braces 228 and 230 extending between the frame section 96*b* and laterally opposite ends of the front wall 224 assist with maintaining the pan in its illustrated orientation. The pan is otherwise open along its rear and outer sides so as to define a rear inlet opening for receiving vegetation and water from the outlet defined by the shroud 202 and an outer side discharge opening for discharging the vegetation and water. It is noted that the illustrated pan does not slope downwardly toward the outer side opening for facilitating movement of vegetation and water from the inlet opening to the discharge opening, although such a configuration is entirely within the ambit of the present invention. However, the illustrated chute section 220*b* is provided with a plurality of laterally spaced flutes 232 projecting upwardly from the bottom wall 222. The flutes 232 curve toward the side discharge opening so that vegetation and water propelled onto the pan is carried by its own momentum toward the side discharge opening. It will also be noted that the pan width defined between the front wall 224 and the rear opening (also defined by the width of the bottom wall 222 in the illustrated embodiment) increases as the side discharge opening is approached. This accommodates the progressively increasing volume of vegetation and water carried by the pan as the side discharge opening is approached. Although the bottom wall 224 of the pan slopes downwardly and rearwardly during operation, as shown in FIG. 5, it will be appreciated that the velocity of the material propelled through the outlet by the shredder 158 is sufficiently high so that essentially all the material is directed by the flutes 232 toward the side discharge opening, rather than back flowing off the rearward edge of the pan.

The operation of the apparatus 10 should be apparent from the foregoing description. Thus, it shall be sufficient to explain that the watercraft 12 is propelled through a body of water by the paddle wheels 64 and 66 which may be independently controlled by an operator within the cab 60. Upon encountering a mass of floating vegetation, the operator actuates the hydraulic cylinders 115 and 116 to swing the processing header 14 into the operating position shown in FIGS. 5 and 6, if it has not already been done so. The feeder 118, which is entirely submerged in the illustrated embodiment, is the first component to engage the mass of vegetation. As the feeder 118 rotates in the direction of arrow 156 (FIG. 6), the paddle assemblies 122 pull the vegetation downwardly below the water surface and under the feeder, and deliver vegetation to the suction chamber 216. Movement of vegetation toward the suction chamber 216 is facilitated by the pumping action created by the rotating shredder 158. That is, because the shredder 158 sucks vegetation and water from the suction chamber 216 into the passageway 218, vegetation and water is drawn toward the suction chamber 216. As just indicated, vegetation and water within the suction chamber 216 is sucked into the sealed passageway 218 and eventually propelled through the outlet 210. It will be appreciated that, while the vegetation moves from the suction chamber 216 to the outlet 210, the cutting discs 166 shred the vegetation into relatively small particles. It is also noted that the retainer plate 198 prevents vegetation from simply moving past the processing header 14 and under the hull 16 without being shredded. The water and shredded vegetation propelled through the outlet 210 by the shredder 158 is received by the discharge chute 220 and returned to the body of water adjacent the port and starboard sides of the watercraft so as to not interfere with the incoming, unprocessed vegetation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the casing framework 194 may be variously constructed, with vegetation shredder cooperating with the new framework construction to form a sealed passageway extending between a suction chamber and an outlet.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An apparatus for destroying aquatic vegetation in proximity to the surface of a body of water, said apparatus comprising:

a watercraft presenting opposite port and starboard sides;

an elongated vegetation shredder rotatable about a horizontal axis and supported forwardly of the watercraft to project below the water surface; and an elongated feeder rotatable about a horizontal axis and positioned forwardly of the shredder to positively feed vegetation to the shredder as the watercraft moves in a forward direction, each of said vegetation shredder and said feeder projecting laterally outward beyond the port and starboard sides of the watercraft.

2. An apparatus as claimed in claim 1, said watercraft including a power source and a propulsion assembly drivingly coupled to the power source.

3. An apparatus as claimed in claim 2, said propulsion assembly including a pair of independently controllable paddle wheels.

4. An apparatus as claimed in claim 3, said watercraft presenting opposite bow and stern ends, said paddle wheels being positioned adjacent the stern end, and said shredder and feeder being position adjacent the bow end.

5. An apparatus as claimed in claim 1; and a retainer spaced generally rearwardly from the shredder and configured to project into the water beyond the shredder for restricting movement of vegetation past the shredder.

6. An apparatus as claimed in claim 5, said retainer comprising a substantially flat, solid panel.

7. An apparatus as claimed in claim 1, said shredder including a laterally extending, rotatable central shaft and a plurality of cutting discs spaced along the length of the shaft.

8. An apparatus as claimed in claim 7, said shaft including a pair of spaced apart, axially aligned sections of substantially equal length.

9. An apparatus as claimed in claim 7, said shredder including at least one spacer positioned between each adjacent pair of cutting discs.

10. An apparatus for destroying aquatic vegetation in proximity to the surface of a body of water, said apparatus comprising:

a watercraft presenting opposite port and starboard sides;

a vegetation shredder supported forwardly of the watercraft to project below the water surface; and a feeder positioned forwardly of the shredder to positively feed vegetation to the shredder as the watercraft moves in a forward direction, said feeder including a laterally extending, rotatable drum and a plurality of spaced paddle assemblies projecting from the drum, said vegetation shredder and said feeder projecting laterally outward beyond the port and starboard sides of the watercraft.

11. An apparatus as claimed in claim 10, each of said paddle assemblies comprising at least two outwardly projecting supports spaced along the length of the drum, and an elongated blade supported by the supports at a position spaced from the drum.

12. An apparatus as claimed in claim 10, said feeder being at least partly submergible, said paddle assemblies being operable to force the vegetation under the feeder and toward the shredder, when said drum is rotated in a first direction.

13. An apparatus for destroying aquatic vegetation in proximity to the surface of a body of water, said apparatus comprising:

a watercraft;

a vegetation shredder supported on the watercraft to project below the water surface; and a feeder positioned forwardly of the shredder to positively feed vegetation to the shredder as the watercraft moves in a forward direction, said feeder including a laterally extending, rotatable drum and a plurality of spaced paddle assemblies projecting from the drum, said feeder being at least partly submergible, said paddle assemblies being operable to force the vegetation under the feeder and toward the shredder, when said drum is rotated in a first direction, said shredder including a laterally extending, rotatable central shaft and a plurality of cutting discs spaced along the length of the shaft, said shredder being supported on the watercraft so that the cutting discs project below the water surface to process vegetation fed thereto by the feeder.

14. An apparatus as claimed in claim 1, said shredder including a laterally extending, rotatable central shaft and a plurality of cutting discs spaced along the length of the shaft; and a casing framework defining a suction chamber below the water surface adjacent the shredder, and an outlet spaced from the suction chamber and above the water surface, said casing framework and said shredder cooperatively defining a sealed passageway extending between the suction chamber and the outlet, said cutting discs being operable to draw vegetation and water from the suction chamber into the passageway and propel vegetation and water in the passageway through the outlet, when the shaft is rotated in a first direction.

15. An apparatus as claimed in claim 14; and a side-discharge chute positioned to receive vegetation and water from the outlet and configured to discharge vegetation and water received from the outlet to the body of water adjacent one of said port or starboard sides.

16. An apparatus for destroying aquatic vegetation in proximity to the surface of a body of water, said apparatus comprising:

a watercraft;

a vegetation shredder supported on the watercraft to project below the water surface;

a feeder positioned forwardly of the shredder to positively feed vegetation to the shredder as the watercraft moves in a forward direction, said shredder including a laterally extending, rotatable central shaft and a plurality of cutting discs spaced along the length of the shaft;

a casing framework defining a suction chamber below the water surface adjacent the shredder, and an outlet spaced from the suction chamber and above the water surface, said casing framework and said shredder cooperatively defining a sealed passageway extending between the suction chamber and the outlet, said cutting discs being operable to draw vegetation and water from the suction chamber into the passageway and propel vegetation and water in the passageway through the outlet, when the shaft is rotated in a first direction, said watercraft presenting opposite port and starboard sides; and a side-discharge chute positioned to receive vegetation and water from the outlet and configured to discharge vegetation and water received from the outlet to the body of water adjacent one of said port or starboard sides, said framework including:

a laterally extending retainer spaced generally rearwardly from the shredder and configured to project into the water beyond the shredder for restricting movement of vegetation past the shredder, a shroud at least partly encasing the shredder and including an arcuate back wall projecting from the retainer to extend along the length of the central shaft, with a forward edge of the back wall terminating at the outlet, and a pair of sidewalls depending from the back wall to project into the water adjacent opposite ends of the shaft, and a plurality of forwardly projecting deflectors spaced along the length of the retainer and configured to project into the water, with each deflector including an arcuate leading edge that is substantially concentric with the cutting discs.

17. An apparatus as claimed in claim 16, said feeder being at least partly submergible and including a laterally extending, rotatable drum and a plurality of spaced paddle assemblies projecting from the drum, said paddle assemblies being operable to force the vegetation under the feeder and toward the suction chamber, when the drum is rotated in said first direction.

18. An apparatus for destroying aquatic vegetation in proximity to the surface of a body of water, said apparatus comprising:

a watercraft presenting opposite port and starboard sides;

a vegetation shredder supported on the watercraft to project below the water surface;

a shroud at least partly encasing the shredder and defining a generally forwardly facing outlet spaced above the water surface, said shredder being operable to propel vegetation and water forwardly through the outlet; and a side-discharge chute positioned to receive vegetation and water from the outlet and configured to discharge vegetation and water received from the outlet to the body of water adjacent one of said port or starboard sides.

19. An apparatus for destroying aquatic vegetation in proximity to the surface of a body of water, said apparatus comprising:

a watercraft presenting opposite port and starboard sides;

a vegetation shredder supported on the watercraft to project below the water surface;

a shroud at least partly encasing the shredder and defining an outlet spaced above the water surface, said shredder being operable to propel vegetation and water through the outlet; and a side-discharge chute positioned to receive vegetation and water from the outlet and configured to discharge vegetation and water received from the outlet to the body of water adjacent one of said port or starboard sides, said shredder comprising a laterally extending, rotatable shredding element, said shroud including a back wall extending along the length of the shredding element, with a forward edge of the back wall terminating at the outlet, and a pair of side walls depending from the back wall to project into the water.

20. An apparatus as claimed in claim 19, said side-discharge chute including a port section configured to discharge vegetation and water received from the outlet to the body of water adjacent the port side of the watercraft, and a starboard section configured to discharge vegetation and water received from the outlet to the body of water adjacent the starboard side of the watercraft.

21. An apparatus as claimed in claim 20, each of said sections of the side-discharge chute including an elongated pan having a longitudinally extending bottom wall, a longitudinally extending front wall projecting upwardly from the bottom wall, an inner sidewall projecting upwardly from the bottom wall, a rear opening for receiving vegetation and water from the outlet, and an outer side opening for discharging the vegetation and water.

22. An apparatus as claimed in claim 21, each of said sections of the discharge chute including a plurality of upright flutes spaced along the length of the bottom wall, each of said flutes curving laterally outwardly toward the outer side opening of the pan.

23. An apparatus as claimed in claim 22, said front wall and said rear opening defining a pan width therebetween which increases as the outer side opening is approached from the inner sidewall.

24. An apparatus for destroying aquatic vegetation in proximity to the surface of a body of water, said apparatus comprising:

a watercraft moveable in a first direction on the body of water;

a vegetation shredding element rotatably supported on the watercraft, with at least portion of the element projecting below the water surface; and a casing framework defining a suction chamber below the water surface adjacent said portion of the shredding element, and an outlet spaced from the suction chamber and above the water surface, said casing framework and said shredding element cooperatively defining therebetween a sealed passageway extending between the suction chamber and the outlet, said shredding element being rotatable in a direction to create a pumping action that causes vegetation and water to be drawn from the suction chamber into the passageway and propelled from the passageway through the outlet, said shredding element and outlet cooperatively oriented for propelling the vegetation and water generally in said first direction.

25. An apparatus as claimed in claim 24, said framework including a laterally extending retainer spaced generally rearwardly from the shredding element and configured to project into the water beyond said portion of the element for restricting movement of vegetation past the element.

26. An apparatus for destroying aquatic vegetation in proximity to the surface of a body of water, said apparatus comprising:

a watercraft;

a vegetation shredding element rotatable supported on the watercraft, with at least portion of the element projecting below the water surface, and a casing framework defining a suction chamber below the water surface adjacent said portion of the shredding element, and an outlet spaced from the suction chamber and above the water surface, said casing framework and said shredding element cooperatively defining a sealed passageway extending between the suction chamber and the outlet, said shredding element being rotatable in a direction to draw vegetation and water from the suction chamber into the passageway and propel vegetation and water in the passageway through the outlet, said framework including a laterally extending retainer spaced generally rearwardly from the shredding element and configured to project into the water beyond said portion of the element for restricting movement of vegetation past the element, said framework including a shroud at least partly encasing the shredding element and including an arcuate back wall projecting from the retainer to extend along the length of the retainer, with a forward edge of the back wall terminating at the outlet, and a pair of sidewalls depending from the back wall to project into the water adjacent opposite ends of the element.

27. An apparatus as claimed in claim 26, said framework including a plurality of forwardly projecting deflectors spaced along the length of the retainer and configured to project into the water.

28. An apparatus as claimed in claim 27, said watercraft presenting opposite port and starboard sides, and a side-discharge chute positioned to receive vegetation and water from the outlet and configured to discharge vegetation and water received from the outlet to the body of water adjacent one of said port or starboard sides.

29. An aquatic vegetation processing header for attachment to a watercraft, said header comprising:

a frame swingably connectable to the watercraft;

a vegetation shredder mounted on the frame, with at least a portion of the shredder being submergible;

a feeder supported by the frame in a position spaced forwardly of the shredder to positively feed vegetation to the shredder as the watercraft moves in a forward direction, and a retainer spaced generally rearwardly from the shredder and configured to project into the water below said portion of the shredder for restricting movement of vegetation past the shredder, said shredder including a laterally extending, rotatable central shaft and a plurality of cutting discs spaced along the length of the shaft, said feeder including a laterally extending, rotatable drum and a plurality of spaced paddle assemblies projecting from the drum.

30. A processing header as claimed in claim 29, said retainer comprising a substantially flat, solid panel.

31. A processing header as claimed in claim 29, each of said paddle assemblies comprising at least two outwardly projecting supports spaced along the length of the drum, and an elongated blade supported by the supports at a position spaced from the drum.

32. A processing header as claimed in claim 29, said feeder being at least partly submergible, said paddle assemblies being operable to force the vegetation under the feeder and toward the vegetation shredder, when the drum is rotated in said first direction.

* * * * *